United States Patent
Anderson et al.

(10) Patent No.: US 8,914,524 B1
(45) Date of Patent: Dec. 16, 2014

(54) LOAD TIME ADAPTED NETWORK PAGE(S)

(75) Inventors: David J. Anderson, Seattle, WA (US); Bashar Mohd Qudah, Bellevue, WA (US); Stefan M. Haney, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 756 days.

(21) Appl. No.: 13/048,941

(22) Filed: Mar. 16, 2011

(51) Int. Cl.
*G06F 15/16* (2006.01)

(52) U.S. Cl.
USPC .......................................... 709/228; 709/246

(58) Field of Classification Search
USPC ................................. 709/228, 246
See application file for complete search history.

(56) References Cited

U.S. PATENT DOCUMENTS

| | | | |
|---|---|---|---|
| 6,138,156 A * | 10/2000 | Fletcher et al. | 709/224 |
| 6,681,380 B1 * | 1/2004 | Britton et al. | 717/115 |
| 7,212,678 B2 * | 5/2007 | Brown et al. | 382/240 |
| 7,222,306 B2 * | 5/2007 | Kaasila et al. | 715/801 |
| 7,594,194 B2 * | 9/2009 | Makela | 715/864 |
| 7,634,562 B2 * | 12/2009 | Litofsky et al. | 709/224 |
| 7,865,594 B1 | 1/2011 | Baumback et al. | |
| 7,917,618 B1 | 3/2011 | Bettis et al. | |
| 7,970,897 B1 | 6/2011 | Baumback et al. | |
| 8,069,182 B2 * | 11/2011 | Pieper | 707/769 |
| 8,078,614 B2 * | 12/2011 | Clary et al. | 707/727 |
| 8,122,124 B1 | 2/2012 | Baumback et al. | |
| 8,161,042 B2 * | 4/2012 | Clary et al. | 707/727 |
| 8,185,634 B2 | 5/2012 | Baumback et al. | |
| 8,254,685 B2 * | 8/2012 | Greene et al. | 382/181 |
| 8,286,176 B1 | 10/2012 | Baumback et al. | |
| 8,316,124 B1 | 11/2012 | Baumback et al. | |
| 8,429,265 B2 | 4/2013 | Baumback et al. | |
| 8,452,870 B2 | 5/2013 | Baumback et al. | |
| 8,489,737 B2 | 7/2013 | Baumback et al. | |
| 8,549,531 B2 | 10/2013 | Baumback et al. | |
| 2003/0095135 A1 * | 5/2003 | Kaasila et al. | 345/613 |
| 2005/0066286 A1 * | 3/2005 | Makela | 715/764 |
| 2005/0071757 A1 * | 3/2005 | Ehrich et al. | 715/513 |
| 2007/0028286 A1 * | 2/2007 | Greene et al. | 725/135 |
| 2007/0250468 A1 * | 10/2007 | Pieper | 707/1 |
| 2008/0175504 A1 * | 7/2008 | Greene et al. | 382/251 |
| 2008/0222235 A1 * | 9/2008 | Hurst et al. | 709/201 |
| 2009/0150385 A1 * | 6/2009 | Clary et al. | 707/5 |
| 2011/0252082 A1 * | 10/2011 | Cobb et al. | 709/203 |
| 2013/0024501 A1 * | 1/2013 | Tahan | 709/203 |

* cited by examiner

*Primary Examiner* — Douglas Blair
(74) *Attorney, Agent, or Firm* — Thomas | Horstemeyer LLP

(57) ABSTRACT

Disclosed are various embodiments for generating a network page having a data density that corresponds to a network page load time for a client in communication with an electronic commerce system. In one embodiment, the electronic commerce system determines a network page load time for a client and draws an association between the client and a data density based at least in part on the network page load time. The electronic commerce system generates a network page having the data density and serves the network page for the client.

33 Claims, 6 Drawing Sheets

US 8,914,524 B1

LOAD TIME ADAPTED NETWORK PAGE(S)

BACKGROUND

Web pages include a variety of types of content such as text, pictures, videos, graphics, animation, and other types of content. A web page server generates the web page that includes the types of content and serves the same up for a client in response to a client request. The client then receives the web page and a browser on the client renders the web page on a display device.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to generating a network page having a data density based at least in part on a network page load time. For example, the network page load time may be determined from a connection speed between a client and a computing device, a computing speed of the client, and/or any other approach, as will be described. A data density that corresponds to the network page load time may be determined from a look-up table, among other approaches, and a network page is generated at or near the determined data density as will be described. In the following discussion, a general description of the system and its components is provided, followed by a discussion of the operation of the same.

Figure 1:
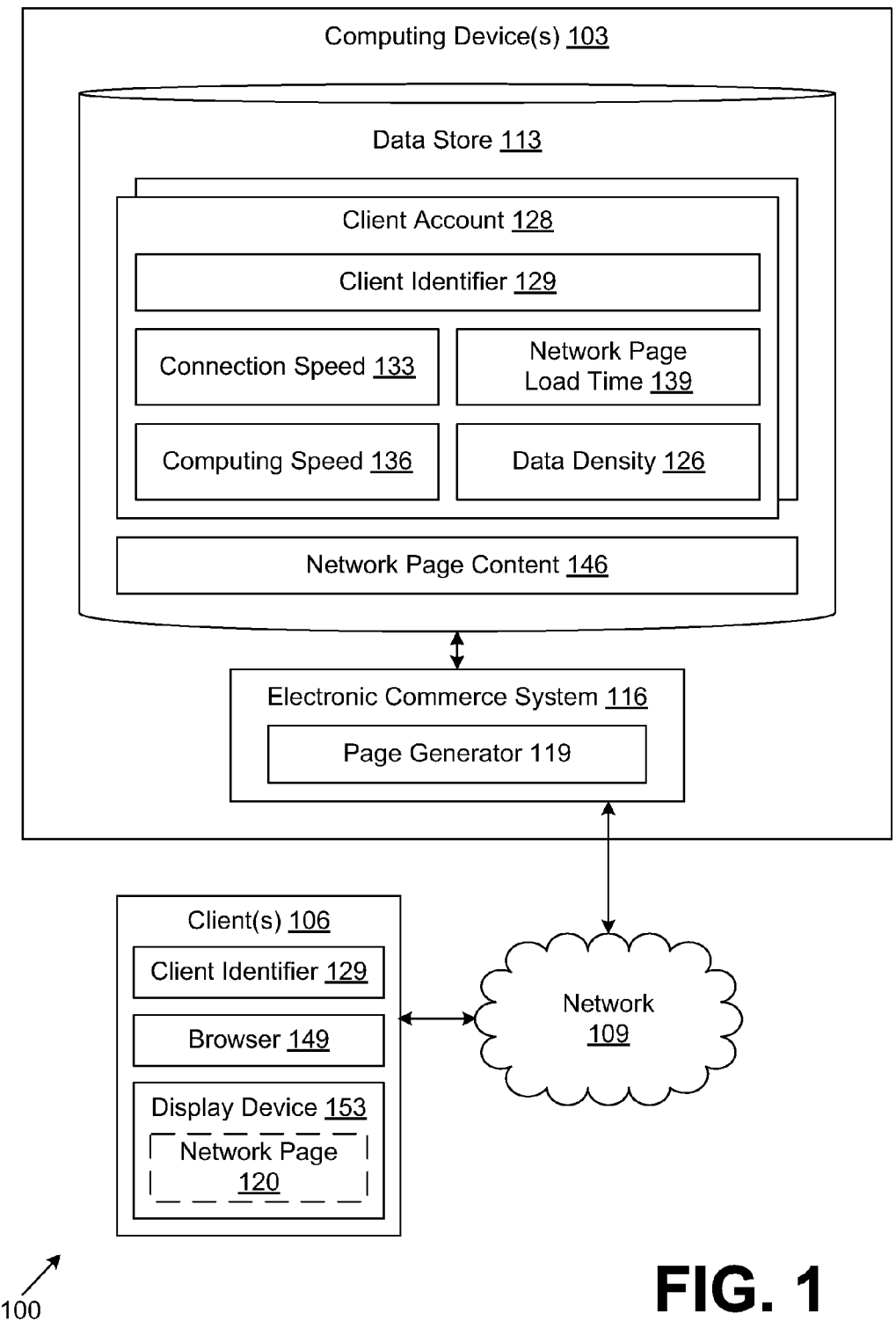
FIG. 1 is a drawing of a networked environment according to various embodiments of the present disclosure.

With reference to FIG. 1, shown is a networked environment 100 according to various embodiments. The networked environment 100 includes a computing device 103, a client 106, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113, for example, is associated with the operation of the various applications and/or functional entities described below.

The components executed on the computing device 103, for example, include an electronic commerce system 116 and other applications, services, processes, systems, engines, or functionality not discussed in detail herein. The electronic commerce system 116 is executed in order to facilitate the online purchase of items over the network 109. The electronic commerce system 116 also performs various backend functions associated with the online presence of a merchant in order to facilitate the online purchase of items as will be described. For example, the electronic commerce system 116 serves up network pages 120 such as web pages or other types of network content that are provided to clients 106 for the purposes of selecting items for purchase, rental, download, lease, or other form of consumption as will be described.

Additionally, the electronic commerce system 116 can generate a network page 120 by executing a page generator 119. For instance, the page generator 119 may be configured to generate the network page 120 (such as web pages) having a data density 126 in response to requests such as HTTP requests from the client 106 in association with the operation of the electronic commerce system 116. For instance, the network page 120 is generated at a data density 126 that is based at least in part on a network page load time 139. In one embodiment, the page generator 119 may obtain the data density 126 from the data store 113. In another embodiment, the page generator 119 may determine the data density 126 based on a real-time calculation, as will be described.

The data stored in the data store 113 includes, for example, a client account 128 that stores information for each client in communication with the client device 103. For instance, each client 106 may be represented by a corresponding client identifier 129 stored in the client account 128. The information stored includes a connection speed 133, a computing speed 136, a network page load time 139, a data density 126, and potentially other information. Also stored in the date store 113 is network page content 146, and potentially other data.

In one embodiment, the connection speed 133 is a rate of data transfer between the computing device 103 and the client 106. The computing speed 136 describes a processing speed of the client 106 which may depend on a processor speed, a memory size of the client 106, an execution speed of the client 106, any other type of computing speed measurement, and/or a combination of any of the above. For instance, the execution speed of the client 106 may correspond to an efficiency of an operating system for the client 106, a type of browser on the client 106, applications being executed on the client 106, and/or any other factor that may affect the execution speed on the client 106. For example, an efficient operating system, browser and/or other application may correspond to a faster execution speed because they may be able to take advantage of the available computing resources to generate and/or execute instructions, or for other reasons. The network page load time 139 corresponds to an amount of time required by the client 106 to load and render the network page 120. For instance, the network page load time 139 may correspond to an amount of time it takes the client 106 to receive a network page 120 plus the time it takes the browser to render the network page 120 on a display device 153.

In another embodiment, the network page load time 139 may correspond to an average load time determined from a predefined number of network pages downloaded over time, network pages downloaded in a given session, and/or any other frequency, as will be described. In addition, the data density 126 may be a previously determined data density for a network page 120, as will be described. Additionally, the network page content 146 includes content that is used to generate network page(s) 120 served up to the client 106.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may include a client identifier 129 that uniquely represents the client 106. For example, the client identifier 129 may be a unique number, name, and/or any other combination of characters. Additionally, the client 106 may be configured to execute various applications such as a browser 149 and/or other applications. The browser 149 may be executed in a client 106, for example, to access and render network pages, such as web pages, or other network content served up by the computing device 103 and/or other servers. For instance, the browser 149 may render network page 120 on a display device 153. The client 106 may be configured to execute applications beyond browser 149 such as, for example, email applications, instant message applications, and/or other applications.

Next, a general description of the operation of the various components of the networked environment 100 is provided. To begin, the client 106 may receive a network page 120 served up by the electronic commerce system 116 and a browser 149 may render the network page 120 on a display device 153, as described above.

In one embodiment, the amount of time it takes a client 106 to receive and the browser 149 to render the network page 120 is known as the network page load time 139. As such, the network page load time 139 may vary for each client 106 based at least in part on a connection speed 133 between the client 106 and the computing device 103, a computing speed 136 of the client 106, and/or any other factors as mentioned above.

In addition, the network page load time 139 may also depend on a data density 126 of the network page 120 being received and rendered. For instance, assuming that the connection speed 133 and the computing speed 136 remain constant, the network page load time 139 will increase as the data density 126 of the network page 120 increases. Similarly, the network page load time 139 will decrease as the data density 126 of the network page 120 decreases. In one embodiment, the data density 126 of the network page 120 may be manipulated by adjusting the amount and magnitude of network page content 146 included in the network page 120. Thus, according to one embodiment, the data density 126 for a network page 120 is varied to achieve a desired or target network page load time 139 for a client 106.

In one embodiment, a number of clients 106, each having a unique client identifier 129, may be in communication with the electronic commerce system 116. When communication is first initiated between the client 106 and the electronic commerce system 116, the electronic commerce system 116 identifies the client identifier 129 for the client 106 and determines the network page load time 139 associated with that client 106. Using this network page load time 139, the electronic commerce system 116 can draw an association between the client 106 and a data density 126 for network pages 120 to be generated for that client 106, as will be described.

In one embodiment, the electronic commerce system 116 may determine the network page load time 139 by measuring the connection speed 133 between the computing device 103 and the client 106. For instance, the electronic commerce system 116 may execute one of a variety of speed tests such as bandwidth tests, DSL speed tests, cable modem speed tests, and/or any other type of speed test to measure the rate of connection. Having measured a rate of data transfer between the computing device 103 and the client 106, the electronic commerce system 116 may determine the network page load time 129 for a given amount of data.

In another embodiment, the electronic commerce system 116 may determine the network page load time 139 by measuring the computing speed 136 of the client 106. For instance, the electronic commerce system 116 may measure an amount of time it takes for the client 106 to execute a set of instructions. In one embodiment, the amount of time it takes the client 106 to execute the instructions may be based at least in part on a processor speed of the client 106, a memory size of the client 106, an execution speed of the client 106, and/or any other factors that may affect execution time. In another embodiment, the network page load time 129 may be determined from a combination of the connection speed 133, the computing speed 136, and/or any other factor attributable to the network page load time 129.

Further, the electronic commerce system 116 may measure a network page load time 139 in a variety of frequencies. In one embodiment, the electronic commerce system 116 may measure the connection speed 133 with the client 106, the computing speed 136 of the client 106, and/or any other measurement for each network page 120 generated and served up for the client 106. As such, the electronic commerce system 116 determines the network page load time 139 for each request for network page 120 received from the client 106.

In another embodiment, the electronic commerce system 116 may obtain the measurements and determine a network page load time 139, as discussed above, at a start of every session of communication with the client 106. The electronic commerce system 116 then uses this network page load time 139 for the duration of the session with the client 106. For example, the electronic commerce system 116 may use the same network page load time 139 for generating all network pages 120 served up to the client 106 during that session.

In yet another embodiment, the electronic commerce system 116 may determine the network page load time 139 on a first contact with the client 106. For instance, during an initial communication with the client 106, the electronic commerce system 116 may determine the network page load time 139 and store it in the data store 113 in the client account 128 associated with the client 106. Here, the electronic commerce system 116 may use the same network page load time 139 for generating all future network pages 120 served up to the client 106.

In other embodiments, the electronic commerce system 116 may determine the network page load time 139 for the client 106 periodically, at a random times, at predefined intervals, and/or any other frequency.

In another embodiment, the network page load time 139 may be a previously determined load time. For instance, on subsequent communications after a first contact with the client 106, the electronic commerce system 116 may use a network page load time 139 determined from a previous communication with the client 106. In particular, the electronic commerce system 116 may use the previously determined network page load time 139 from the data store 113 for the client 106 having a client identifier 129. The network page load time 139 used from the data store 113 may have been previously determined for a last network page 120 served up to the client 106, previously determined on a last session with the client 106, and/or previously determined upon a first contact with the client 106, as described above. In one embodiment, the network page load time 129 may be a running average of a predetermined number of load times for a predefined number of network pages 120 served up to the client 106 and/or a predefined number of sessions with the client 106.

Having determined the network page load time 139, the electronic commerce system 116 then determines a data density 126 associated with the network page load time 139. In one embodiment, the electronic commerce system 116 draws an association between the network page load time 139 for the client 106 and the data density 126. Upon determining the data density 126, the electronic commerce system 116 executes the page generator 119 to generate a network page 120 at or near the determined data density 126 that corresponds to the network page load time 139, as will be described.

In one embodiment, the electronic commerce system 116 determines the data density 126 by dividing a spectrum of network page load times 139 into many ranges of load times. The ranges of load times may span from a slow end of the spectrum to a fast end of the spectrum of network page load times 139. The electronic commerce system 116 associates a data density 126 for each range of load times. Thus, in one embodiment, clients 106 having a network page load time 139 within a specific range of load of times may all have the same data density 126. Additionally, the size of each range of load times may vary. For instance, a range of load times many comprise a single network page load time 139. As such, in one embodiment, each individual network page load time 139 may correspond to a data density 126.

In one embodiment, an inverse relationship between the network page load time 139 and the data density 126 is specified. An inverse relationship between the data density 126 and the network page load time 139 may allow the electronic commerce system 116 to keep load times substantially similar for many clients 106 while transmitting varying amounts of content to the clients 106. In particular, in order to keep network page load times 139 consistent between all clients 106 in communication with the computing device 103, the electronic commerce system 116 may vary the respective data density 126 values for each of the clients 106. For instance, the electronic commerce system 116 may decrease the data density 126 of a network page 120 served up to a client 106 if the network page load time 139 for that client 106 exceeds a desired load time. Given that the electronic commerce system 116 may not be able to vary the connection speed 133 with the client 106 and/or the computing speed 136, the electronic commerce system 116 may reduce the data density 126 for a network page 120 to be generated to reduce the network page load time 139 to a more desirable time.

Additionally, the electronic commerce system 116 may determine a value for the data density 126 in a variety of ways. In one embodiment, an equation may be defined that generates a data density 126 as a function of the network page load time 139. Such an equation may be used to determine the data density 126 value. In another embodiment, a look-up table that correlates data densities 126 to network page load times 139 may be used to determine the data density 126 values. For example, the look-up table may have been determined from previously stored data such as a previously determined network page load time 139, a previously determined data density 126, and/or any other previously stored data. Additionally, the electronic commerce system 116 may use any other approach to determine a value for the data density 126. In one embodiment, the electronic commerce system 116 stores the determined data density 126 in the data store 113 associated with client 106 having a client identifier 129.

The page generator 119 then generates a network page 120 having a data density 126 determined by the electronic commerce system 116. In one embodiment, the page generator 119 includes network page content 146 from the data store 113 that corresponds to the determined data density 126. For example, a low data density 126 may correspond to less network page content 146 that results in a simple network page 120, such as, low resolution images, simple text, and/or low-end features, as described above. Similarly, a high data density 126 may correspond to more network page content 146 that results in a complex network page 120, such as, high resolution images, active code, and/or high-end features, as described above.

In one embodiment, the network page content 146 may include a variety of content requiring varying amount of resources for storing and processing the network page content 146. For instance, low-end features such as text, low resolution pictures, text input fields, radio buttons, check boxes, tables, hyperlinks, and/or other features may utilize fewer resources to store and process relative to high-end features. High-end features include embedded objects, java script objects, html5 features, movies, high resolution pictures, flash applications, and/or any other features that utilize more resources to store and process relative to the low-end features. Thus, the page generator 119 generates a network page 120 having a data density 126 using a combination of low-end and high-end features obtained from the network page content 146. For example, if a high network page load time 139 corresponds to a low data density 126, the page generator 119 may include primarily low-end features, such as, text, low-resolution images, radio menus, an/or other low-end features. The electronic commerce system 116 then serves up the generated network page 120 for the client 106. In one embodiment, the electronic commerce system 116 may measure the network page load time 139 for the subsequently generated network page 120.

In another embodiment, the page generator 119 may use previously generated network pages 120 based on the data density to serve up to the client 106. For instance, each load time range may correspond to a specific data density 126 as described above. In one embodiment, the page generator 119 may use a previously generated network page 120 or template having a data density 126 that corresponds to the load time range to serve up to the client 106. By using previously generated network pages 120, the page generator 119 may save resources required to generate network pages 120 upon every request received from a client 106.

In another embodiment, the electronic commerce system 116 may also transmit a notification to the client 106 identifying the data density 126 of the network page 120 served up for the client 106. For example, the notification may include the data density 126 of the network page 120, the network page load time 139 used to determine the data density 126, any relevant measurements taken such as the connection speed 133 and the computing speed 136, and/or any other information used to determine the data density 126. Additionally, the notification may also include information related to the spectrum of network page load times 139 such as, for instance, the slowest range of load times, the fastest range of load times, a most common range of load times, and/or other statistical information about the range of load times. In one embodiment, this notification may be included as part of the network page 120 served up to the client 106.

In addition, the electronic commerce system 116 may also provide for a client 106 side selection of a data density 126. For instance, the electronic commerce system 116 may include an option for the user to change the data density 126 as part of the notification transmitted to the client 106. In one embodiment, the user may be presented with an option to increase the data density 126 of the network page 120 served up for the client 106, decrease the data density 126 of the network page 120, and/or allow the electronic commerce system 116 to select the data density 126. In the event that the electronic commerce system 116 receives a request for a network page 120 having a new data density 126, the electronic commerce system 116 executes the page generator 119 to generate a subsequent network page 120 having the requested data density 126. For instance, the user on the client 106 may wish to receive network pages 120 having the highest data density 126 in order to maximize the user's interactive experience even if it will take longer to download. Additionally, the electronic commerce system 116 may provide for the user on the client 106 to elect to receive a network page 120 having the selected data density 126 for a next network page 120, for a remainder of the current session with the client 106, for a next session with the client 106, for all future communications with the client 106, and/or any other frequency.

In another embodiment, the electronic commerce system 116 may determine the network page load time 139 for the client 106 and compare it with a target load time. For instance, the target load time may be a constant time that the electronic commerce system 116 seeks to uniformly establish with all clients 106 in communication with the computing device 103. If the network page load time 139 is greater than the target load time, the electronic commerce system 116 may reduce the data density 126 of subsequent network pages 120 to reduce the network page load time 139. Similarly, if the network page load time 139 is less than the target load time, the electronic commerce system 116 may increase the data density 126 to increase the network page load time 139. For example, the electronic commerce system 116 may transmit additional network page content 146 and still maintain a target load time. In one embodiment, the electronic commerce system 116 maintains the data density above a minimum threshold value and below a maximum threshold value. For instance, a minimum threshold value may ensure that a minimum amount of network page content 146 is included in the network page 120, such as, for instance, item information and purchasing information. Additionally, a maximum threshold value may ensure that no more than a maximum amount of network page content 146 is included in the network page 120, for instance, to prevent overcrowding the network page 120.

Figure 2:
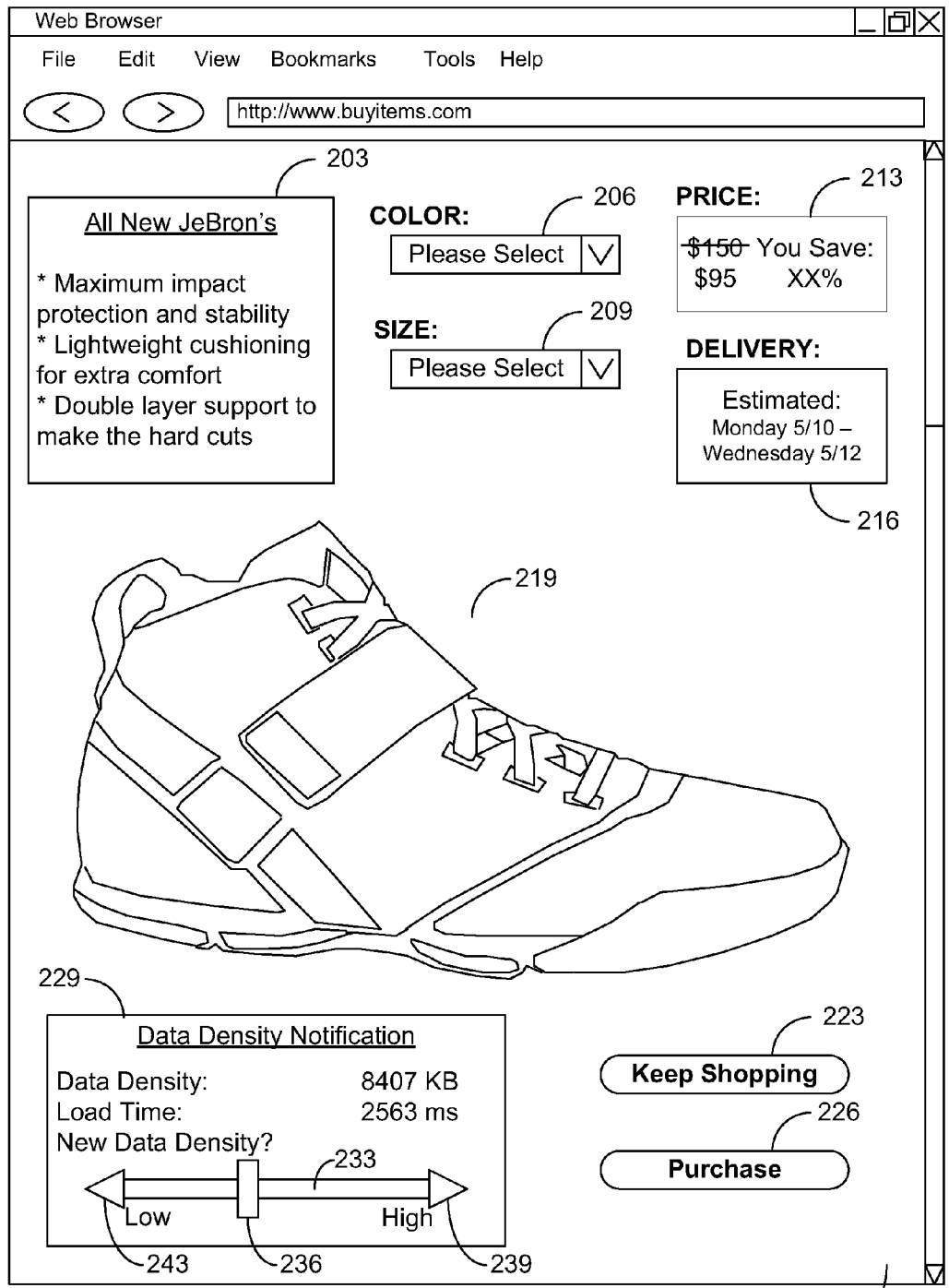
FIGS. 2 and 3 are drawings of an example of a user interface rendered by a client in the networked environment of FIG. 1 according to various embodiments of the present disclosure.

Referring next to FIG. 2, shown is one example of a network page 120, denoted herein as network page 120*a*, having a low data density 126 (FIG. 1), according to various embodiments of the present disclosure. The various graphical components such as the blocks comprising different information shown in FIG. 2 are merely examples of the various types of features that may be used to accomplish the specific functions noted. The network page 120*a* is rendered on a display device 153 (FIG. 1) associated with the client 106 (FIG. 1) according to various embodiments.

In one embodiment, the page generator 119 (FIG. 1) generates the network page 120*a* to display various network page content 146 (FIG. 1) served up by the electronic commerce system 116 (FIG. 1). As shown in this embodiment, the network page 120*a* includes a description block 203, a color selection menu 206, a size selection menu 209, a price block 213, a delivery block 216, an image block 219, a keep shopping button 223, a purchase button 226, and a data density notification window 229.

In this embodiment, the features of the network page 120*a* depicted in FIG. 2 are low-end features that require fewer resources to process and store than high-end features. For example, the description block 203, the price block 213, and the delivery block 216 are features of the network page 120*a* that may show text related to an item being featured on the network page 120*a*. The color selection menu 206 and the size selection menu 209 may be a simple drop down or ratio button menu. The image block 219 may include a low-resolution picture such as a bmp, jpeg, and/or any other low resolution picture. Additionally, the keep shopping button 223 and the purchase button 226 may be hyperlinks that request additional network pages 120*a* from the electronic commerce system 116.

Additionally, the data density notification window 229 depicts a notification generated by the electronic commerce system 116 that includes data density 126 information. In this example, the data density notification window 229 includes the data density 126 and the network page load time 139 (FIG. 1). Additionally, the data density notification window 229 provides for a user on the client 106 to select a new data density 126 using a slide scale 233. In one embodiment, the slide scale 233 depicts a current bar 236 that corresponds to the data density 126 of the network page 120*a* as depicted. Additionally, the slide scale 233 may include an increase data density button 239 and a decrease data density button 243. For instance, the user may request a new network page 120 having a higher data density 126 by manipulating the increase data density button 239 or a lower data density 126 by manipulating the decrease data density button 239. In addition, the user may decide not to request a new network page 120*a*. In another embodiment, measurements used to determine the network page load time 139 may also be included in the data density notification window 229, such as, for instance, a connection speed 133, a computing speed 136, and/or any other measurements taken to determine the network page load time 139.

Figure 3:
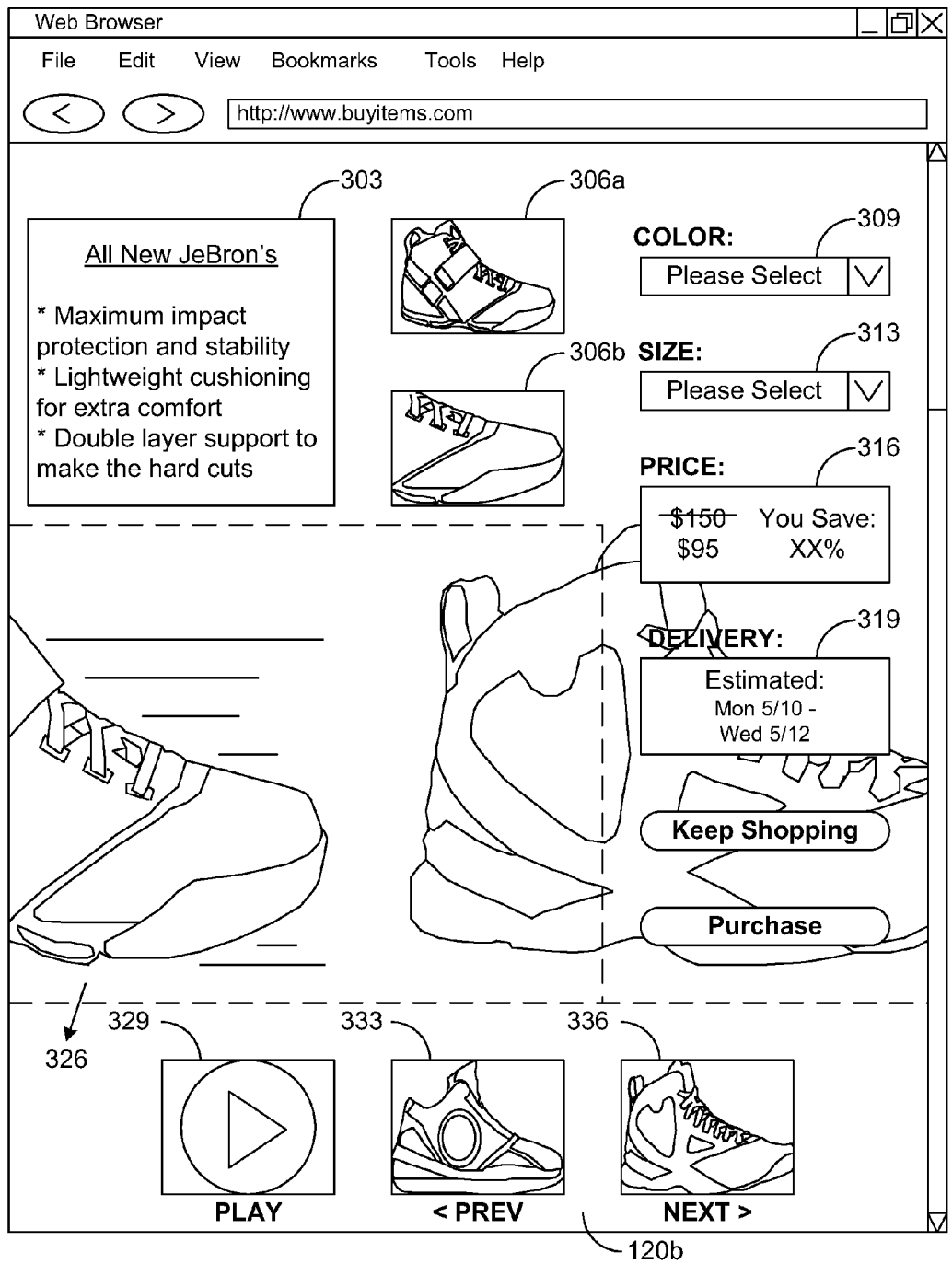

Turning now to FIG. 3, shown is one example of a network page 120, denoted herein as network page 120*b*, having a high data density 126, according to various embodiments of the present disclosure. The various graphical components such as the blocks comprising different information shown in FIG. 3 are merely examples of the various types of features that may be used to accomplish the specific functions noted. The network page 120*b* is rendered on a display device 153 (FIG. 1) associated with the client 106 (FIG. 1) according to various embodiments.

In one embodiment, the page generator 119 (FIG. 1) generates the network page 120*b* to display various network page content 146 (FIG. 1) served up by the electronic commerce system 116 (FIG. 1). As shown in this embodiment, the network page 120b includes a description block 303, alternate view windows 306a/306b, a color selection menu 309, a size selection menu 313, a price block 316, a delivery block 319, an images block 326, an auto play button 329, a previous button 333, and a next button 336.

In this embodiment, the features of the network page 120b depicted in FIG. 3 include high-end features that require more resources to process and store than low-end features. For example, the description block 303, price block 316, and delivery block 319 are features that show text with animation, irregular fonts, and/or other characteristics that require more resources to process and store than plain text. In addition, the color selection block 309 and the size selection block 313 are menus where selecting a color or size option results in an interactive modification of the image depicted in the images block 326 to reflect the selected option. Thus, the color and size selection blocks 309/313 may require more resources to process and store than a low-end drop down and/or radio menu.

The alternate view windows 306a/306b and the images block 326 may show high resolution images depicting the item featured on the network page 120b from alternate angles and magnification. In one embodiment, the alternative view windows 306/306b and the images block 326 may show three dimensional renderings, movies, a slide show and/or any other interactive approach of presenting the item available for purchase. For example, the interactive approach of presenting the items may be embedded objects, java script objects, flash applications, html5 features, and/or any other resource consuming feature, as discussed above.

Additionally, the previous button 333 and the next button 336 may show high resolution images for other items available for purchase, as discussed above in relation to the alternative view windows 306a/306b and the images block 326. For instance, the previous button and the next button 333/336 may show an image for a previous item available for purchase and an image for a next time available for purchase, respectively. Further, the auto play button 329 may present a number of items available for purchase through the electronic commerce system 116 in a timed slide show, and/or any other interactive approach that may require additional resources to process and store. In another embodiment, a data density notification window 229 (FIG. 2) may also be included in the network page 120b that depicts information related to the data density 126, as described above. Therefore, the network page 120b shown in FIG. 3 has a higher data density 126 than the network page 120a shown in FIG. 2 because the features of network page 120b require more resources to process and store than the features of network page 120a.

Figure 4:
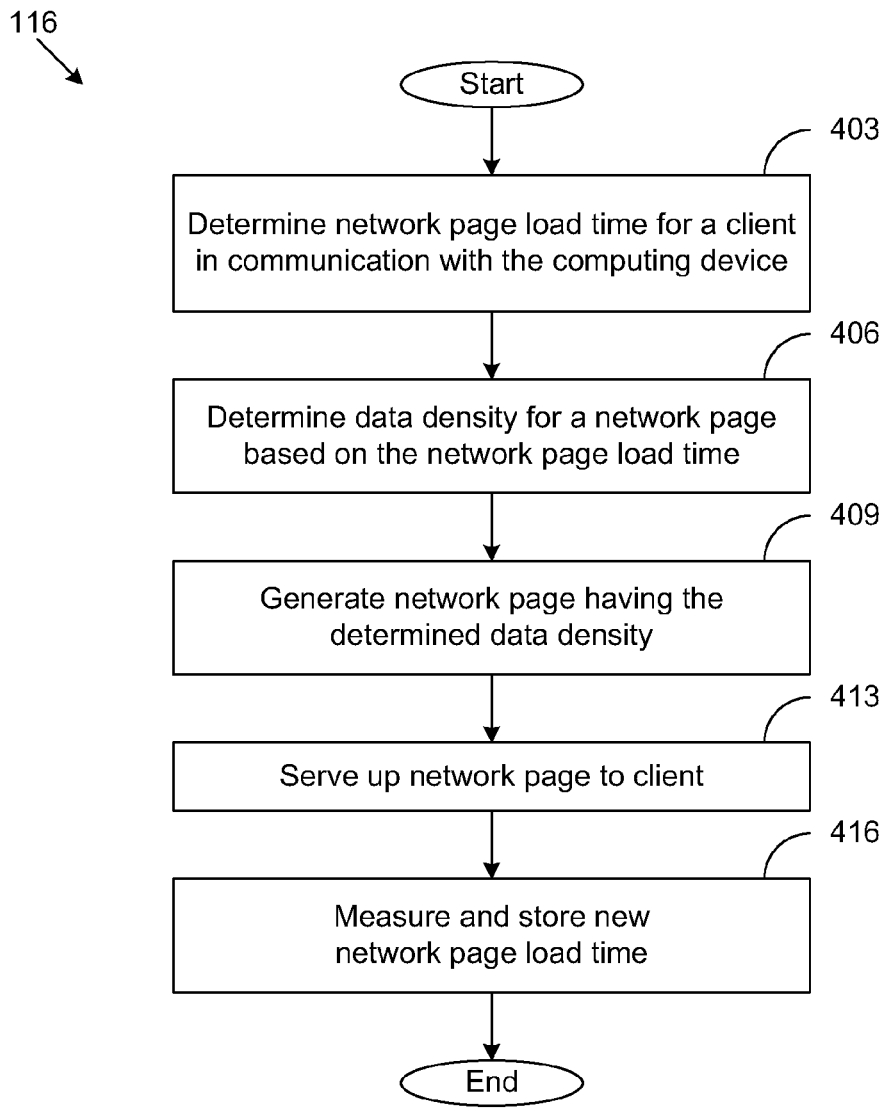
FIGS. 4 and 5 are flowcharts illustrating one example of functionality implemented as portions of an electronic commerce system executed in a computing device in the networked environment of FIG. 1 according to various embodiments of the present disclosure.

Referring next to FIG. 4, shown is a flowchart that provides one example of the operation of a portion of the electronic commerce system 116 according to various embodiments. It is understood that the flowchart of FIG. 4 provides merely an example of the many different types of functional arrangements that may be employed to implement the operation of the portion of the electronic commerce system 116 as described herein. As an alternative, the flowchart of FIG. 4 may be viewed as depicting an example of steps of a method implemented in the computing device 103 (FIG. 1) according to one or more embodiments.

According to one embodiment, the electronic commerce system 116 serves up a network page 120 (FIG. 1) having a specific data density 126 (FIG. 1) that corresponds to a network page load time 139 (FIG. 1) specific for the client 106 (FIG. 1). Included in the network page 120 is an amount of network page content 146 (FIG. 1) that corresponds to the data density 126. Further, the electronic commerce system 116 measures the network page load time 139 for the new network page 120 served up for the client 106.

Beginning with box 403, the electronic commerce system 116 determines the network page load time 139 for a client 106 in communication with the computing device 103 (FIG. 1). In one embodiment, the network page load time 139 is determined based on the connection speed 133 between the client 106 and the computing device 103, the computing speed 136 of the client 106 and/or any other factors contributing to the network page load time 139. For instance, the connection speed 133 may be determined from one or more speed tests performed over the network 109 (FIG. 1) and the computing speed 136 may be determined from an execution time needed by the client 106 to perform a set of instructions, as described above. In another embodiment, the network page load time 139 may be determined from a previously stored load time such as the network page load time 139 for a last network page 120 served up to the client 106, a network page load time 139 determined during a last session with the client 106, an average of previous network page load times 139, and/or any other statistically significant network page load time 139, as described above.

Next, in box 406, the electronic commerce system 116 determines a data density 126 based on the network page load time 139. For instance, the electronic commerce system 116 may determine a value for the data density 126 based on an equation that defines data density 126 as a function of the network page load time 139, a look-up table that correlates a data density 126 value and the network page load time 139, and/or any other approach, as discussed above. Additionally, the electronic commerce system 116 may also determine the data density 126 from a spectrum of network page load times 139, as described above. For instance, the spectrum may include a plurality of load time ranges where each range is associated with a specific data density 126. In one embodiment, the electronic commerce system 116 identifies a load time range into which the network page load time 139 falls. Then, the electronic commerce system 116 associates the client 106 with a data density 126 that corresponds to the load time range. In one embodiment, the data density 126 and the network page load time 139 may be inversely related on the spectrum. For instance, the data density 126 may increase as the load time ranges decrease, as described above.

In box 409, the electronic commerce system 116 generates a network page 120 having the data density 126 determined in box 406. In one embodiment, the electronic commerce system 116 executes the page generator 119 to generate a network page 120 having the determined data density 126 by including a quantity of network page content 146 that corresponds to the determined data density 126. For instance, a smaller data density 126 corresponds to less network page content 146 than a higher data density 126, as described above. In another embodiment, the page generator 119 may also include in the network page 120 a notification that indicates the network page load time 139, the data density 126, the connection speed 133, the computing speed 136, and/or any other measurements that may have been determined. In addition, the user may be provided the option to change the data density 126 of the network page 120 to be higher or lower, as described above.

Then, in box 413, the electronic commerce system 116 serves up the generated network page 120 to the client 106. Finally, in box 416, the electronic commerce system 116 measures the network page load time 139 for the generated network page 120 and stores the network page load time 139 in the data store 113. For instance, the electronic commerce system 116 measures the amount of time it takes for the client 106 to receive the network page 120 and for the browser 149 (FIG. 1) to render the network page 120 on the display device 153, as described above.

Figure 5:
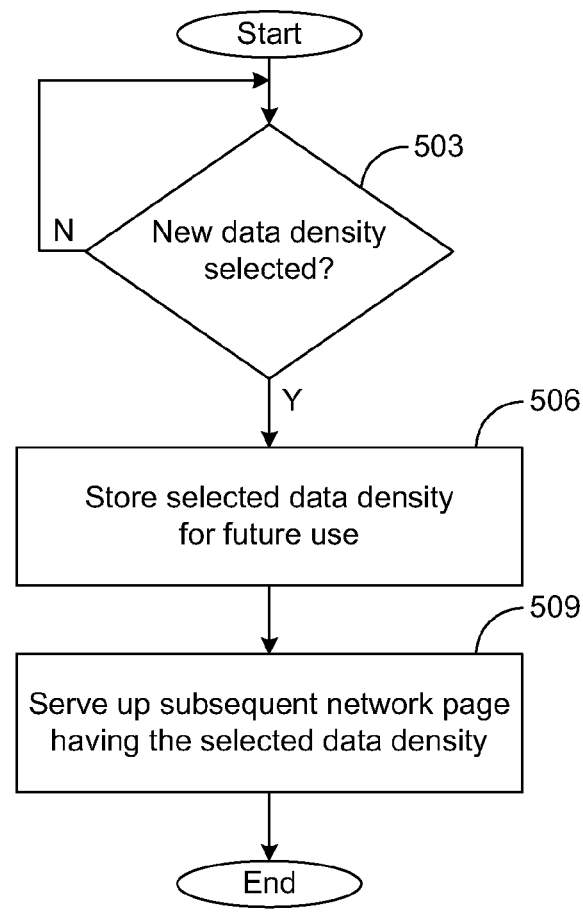

Referring next to FIG. 5, shown is a flowchart that provides one example of the operation of a portion of the electronic commerce system 116 according to various embodiments. It is understood that the flowchart of FIG. 5 provides merely an example of the many different types of functional arrangements that may be employed to implement the operation of the portion of the electronic commerce system 116 as described herein. As an alternative, the flowchart of FIG. 5 may be viewed as depicting an example of steps of a method implemented in the computing device 103 (FIG. 1) according to one or more embodiments.

According to one embodiment, the electronic commerce system 116 serves up a network page 120 (FIG. 1) having a specific data density 126 (FIG. 1) that corresponds to a network page load time 139 (FIG. 1) specific for the client 106 (FIG. 1). Additionally, the electronic commerce system 116 provides for a user side selection of a data density 126. The electronic commerce system 116 generates a new network page 120 having a new data density 126 if requested by a user on the client 106.

Beginning with box 503, the electronic commerce system 116 determines if a request for a network page 120 having a different data density 126 is requested. For instance, a user on client 106 may request a network page 120 having a higher and/or lower data density 126, as described above. If a request for a new network page 120 is received, then the electronic commerce system proceeds to box 506. A timeout feature may be associated with box 503 in the event that the electronic commerce system 116 does not receive a request for a new network page 120.

Next, in box 506, the electronic commerce system 116 stores the selected data density 126 in the data store 113 for future use. For instance, the user may specify a data density 126 value in requesting another network page 120. Then in box 509, the electronic commerce system 116 serves up a subsequent network page 120 having the selected data density 126. In one embodiment, the electronic commerce system 116 may serve up the subsequent network page 120 having the data density provided by the user, as described above. In another embodiment, the user may specify a higher and/or lower data density 126, as described above. In this example, the electronic commerce system 116 may determine a new data density 126 value using one or more of the approaches described above.

Figure 6:
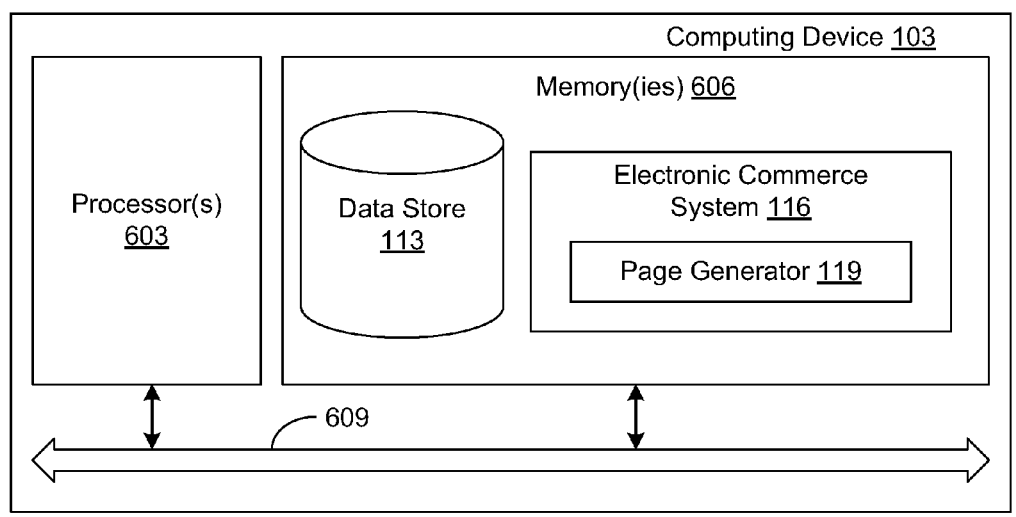
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are an electronic commerce system 116, a page generator 119, and potentially other applications. Also stored in the memory 606 may be a data store 113 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the electronic commerce system 116, the page generator 119, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4 and 5 the functionality and operation of an implementation of portions of the electronic commerce system 116. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 116 and the page generator 119 that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:
    code that determines a network page load time for a client in communication with the computing device, the network page load time being based at least in part on a previously determined load time and at least one of a connection speed or a computing speed, wherein the network page load time is determined on at least one of a per session basis, or a per network page basis, the previously determined load time comprising at least one of a load time for a last session, a load time for a last network page, an average load time for a predefined number of previous sessions, or an average load time for a predefined number of previous network pages;
    code that draws an association between the client and one of a plurality of load time ranges based on the network page load time;
    code that identifies a data density that corresponds to the associated one of the load time ranges;
    code that generates a network page having a density approaching the data density;
    code that serves up the network page to a client;
    code that transmits a notification to the client indicating the data density of the network page; and
    code that generates a new network page to serve up to the client if a request for a new network page having a new data density is received, the new network page having the new data density.

2. The computer-readable medium of claim 1, wherein the computing speed corresponds to at least one of a processing speed of the client, a memory size of the client, or an execution speed of the client.

3. A system, comprising:
    at least one computing device configured to implement one or more services, wherein the one or more services are configured to:
        associate a client with one of a plurality of load time ranges based on a network page load time associated with the client, individual ones of the load time ranges being correlated with a data density;
        identify a data density that corresponds to the one of the plurality of load time ranges;
        compare the network page load time with a target network page load time;
        generate a network page by:
            generating the network page with a reduced data density with respect to the data density if the network page load time is greater than the target network page load time; and
            generating the network page with an increased data density with respect to the data density if the network page load time is less than the target network page load time.

4. The system of claim 3, wherein the network page load time is determined by at least one of a connection speed or a computing speed.

5. The system of claim 4, wherein the connection speed corresponds to a rate of data transfer between the computing device and the client.

6. The system of claim 4, wherein the computing speed corresponds to at least one of a processing speed of the client, a memory size of the client, or an execution speed of the client.

7. The system of claim 3, wherein the plurality of load time ranges encompass a spectrum of network page load times, the load time ranges comprising at least one of a slowest range with respect to the spectrum of network page load times on a slowest end of the spectrum of network page load times and a fastest range with respect to the spectrum of network page load times on a fastest end of the spectrum of network page load times.

8. The system of claim 3, wherein the one or more services are further configured to communicate a notification to the client identifying the data density of the network page.

9. The system of claim 8, wherein the one or more services are further configured to provide for client side selection of the data density of the network page.

10. The system of claim 9, wherein the one or more services are further configured to generate a subsequent network page if a request for a different data density is received, the subsequent network page having the different data density.

11. The system of claim 3, wherein a plurality of static features are included in all network pages.

12. The system of claim 3, wherein the network page load time is measured on a per session basis.

13. The system of claim 3, wherein the network page load time is calculated on a per network page basis.

14. The system of claim 3, wherein the network page load time is a previously determined time.

15. The system of claim 14, wherein the previously determined time is a network page load time for a last session.

16. The system of claim 14, wherein the previously determined time is a network page load time for a last network page.

17. The system of claim 14, wherein the previously determined time is an average network page load time for a predefined number of previous sessions.

18. The system of claim 14, wherein the previously determined time is an average network page load time for a predefined number of previous network pages.

19. The system of claim 3, wherein the one or more services are further configured to measure a network page load time for the network page.

20. The system of claim 3, wherein the data density is maintained above a minimum threshold value and below a maximum threshold value.

21. The system of claim 3, wherein the data density is determined from a look up table that correlates a plurality of network page load times to a plurality of data densities.

22. A method, comprising:
determining, via at least one of a set of computing devices, a network page load time for a client in communication with the at least one of the set of computing devices;
determining, via at least one of a set of computing devices, a data density corresponding to the network page load time;
generating, via at least one of a set of computing devices, a network page having a density within a predefined threshold of the data density;
serving up, via at least one of a set of computing devices, the network page to the client; and
wherein the network page load time is assigned a predetermined time based on at least one of a network page load time for a last session, a network page load time for a last network page, an average network page load time for a predefined number of previous sessions, or an average network page load time for a predefined number of previous network pages.

23. The method of claim 22, wherein the network page load time is determined based on at least one of a connection speed or a computing speed.

24. The method of claim 23, wherein the connection speed corresponds to a rate of data transfer between the computing device and the client.

25. The method of claim 23, wherein the computing speed corresponds to at least one of a processing speed, a memory size, or an execution speed of the client.

26. The method of claim 22, wherein the network page load time is determined on at least one of a per session basis or a per network page basis.

27. The method of claim 22, wherein the data density is determined from a look up table that correlates a plurality of network page load times to a plurality of data densities.

28. The method of claim 22, wherein the data density is determined from an equation based at least on the network page load time.

29. The method of claim 22, further comprising notifying the client of the data density.

30. The method of claim 22, further comprising:
providing for a client side selection of a new data density for a new network page; and
generating the new network page having the new data density if selected.

31. The method of claim 22, further comprising measuring a network page load time for the network page.

32. The method of claim 22, wherein a plurality of static features are included in the network page.

33. The method of claim 22, wherein the data density is maintained above a minimum threshold value and below a maximum threshold value.

* * * * *